US012709319B2

(12) United States Patent
Wilson-Jones et al.

(10) Patent No.: US 12,709,319 B2
(45) Date of Patent: Aug. 18, 2026

(54) STEERING COLUMN ASSEMBLY FOR A VEHICLE

(71) Applicant: ZF Automotive UK Limited, Solihull (GB)

(72) Inventors: Russell Wilson-Jones, Stratford upon Avon (GB); Mark Anthony Wilkes, Kings Norton (GB)

(73) Assignee: ZF Automotive UK Limited, Solihull (GB)

( * ) Notice: Subject to any disclaimer, the term of this patent is extended or adjusted under 35 U.S.C. 154(b) by 414 days.

(21) Appl. No.: 18/334,647

(22) Filed: Jun. 14, 2023

(65) Prior Publication Data

US 2023/0406400 A1 Dec. 21, 2023

(30) Foreign Application Priority Data

Jun. 16, 2022 (GB) ..................................... 2208899

(51) Int. Cl.
*B62D 5/00* (2006.01)
*B62D 3/04* (2006.01)
*B62D 5/04* (2006.01)

(52) U.S. Cl.
CPC ............... *B62D 5/001* (2013.01); *B62D 3/04* (2013.01); *B62D 5/0421* (2013.01)

(58) Field of Classification Search
CPC ......... B62D 5/001; B62D 3/04; B62D 5/0421
USPC .................................................. 180/443, 444
See application file for complete search history.

(56) References Cited

U.S. PATENT DOCUMENTS

2018/0346014 A1* 12/2018 Beyerlein .............. B62D 5/003

FOREIGN PATENT DOCUMENTS

DE 102017205721 A1 * 10/2018 ......... F16H 57/0006
EP 0860346 A2 * 8/1998 ........... B62D 5/0409
JP H08258728 A 10/1996
JP 2007106319 A 4/2007
KR 20040047710 A * 6/2004 ............. F16H 25/24

* cited by examiner

*Primary Examiner* — Jacob D Knutson
(74) *Attorney, Agent, or Firm* — Kristin L. Murphy

(57) ABSTRACT

A steering column assembly for a vehicle comprises: a steering column rotatably mounted about a longitudinal axis and configured for attachment of a steering wheel at one end; a first gear configured to rotate with the steering column; first and second, each having an output driving a respective output gear, the output gears being engaged with the first gear; and an ECU configured to operate the motors to apply torque to the first gear. The output gears are worm gears and the output gears are offset with respect to one another in the direction of the longitudinal axis of the steering column to produce a partial overlap of the contact areas of the first and second output gears with the teeth of the first gear, which reduces wear of the first gear and prolongs its useful life.

21 Claims, 3 Drawing Sheets

STEERING COLUMN ASSEMBLY FOR A VEHICLE

CROSS-REFERENCE TO RELATED APPLICATION

This application claims priority to UK Priority Application No. 2208899.1, filed Jun. 16, 2022, the disclosure of which is incorporated herein by reference in its entirety.

TECHNICAL FIELD

The present disclosure relates to steering column assemblies for vehicles and in particular to such assemblies for use with a steer-by-wire hand wheel actuator.

BACKGROUND

In steer-by-wire arrangements, a handwheel (steering wheel) is connected to one end of a rotatably mounted steering column whose angular displacement is measured to generate a signal which is used to control the orientation of the steered wheels of the vehicle. The arrangement is commonly also provided with an electric motor connected to the steering column to provide a controlled amount of torque in the opposite direction to the torque applied by the driver, in order to provide a sensation of road feel to the driver.

GB 2579374 A discloses a steering column assembly for a steer-by-wire vehicle in which first and second worm gears, each driven by a respective electric motor, are engaged with a common worm wheel gear which is constrained to rotate with a steering column. The electric motors can be controlled to apply torque to the first and second worm gears to provide a sensation of road feel to the driver while at the same time reducing gear train backlash and rattle. The worm wheel gear must be designed to survive through a required number of cycles without excessive fatigue or wear of the worm teeth. However, as the worm wheel gear is engaged with two worm gears, approximately double the amount of fatigue or wear of the worm teeth of the worm wheel gear will occur.

SUMMARY

In accordance with a first aspect of the present disclosure, a steering column assembly for a vehicle comprises:

- a steering column rotatably mounted about a longitudinal axis and configured for attachment of a steering wheel at one end;
- a first gear configured to rotate with the steering column;
- first and second motors, each having an output driving a respective output gear, the output gears being engaged with the first gear; and
- a control arrangement configured to operate the motors to apply torque to the first gear,
- wherein the first and second output gears are offset with respect to one another in the direction of the longitudinal axis to produce a partial overlap of the contact areas of the first and second output gears with the teeth of the first gear.

By offsetting the contact areas of the output gears with the teeth of the first gear, the wear on the first gear is significantly reduced, and consequently the useful life of the first gear is significantly extended.

In addition, partially overlapping the contact areas of the first and second output gears with the teeth of the first gear helps to ensure that gear lubricants are moved across the flanks of each tooth of the first gear so as to ensure that the contact between the gears is always well lubricated.

The rotational axes of the output gears may extend perpendicularly to the rotational axis of the first gear.

The rotational axes of the output gears may be parallel.

The output gears may be substantially identical.

In one exemplary arrangement, the output gears comprise worm gears.

In one exemplary arrangement, the worm gears are substantially identical and the offset of the contact areas of the worm gears with respect to one another in the direction of the longitudinal axis is less than or equal to the diameter of worm gears.

For example, the offset of the contact areas of the worm gears with respect to one another in the direction of the longitudinal axis may be from 10% to 40% of the diameter of the worm gears. In another exemplary arrangement, the offset may be from 20% to 30% of the diameter of the worm gears.

The rotational axes of the worm gears may be offset with respect to one another in the direction of the longitudinal axis.

In one exemplary arrangement, the offset of the worm gears with respect to one another in the direction of the longitudinal axis is less than or equal to the diameter of the worm gears.

For example, the offset of the worm gears with respect to one another in the direction of the longitudinal axis may be from 10% to 40% of the diameter of the worm gears. In another exemplary arrangement, the offset may be from 20% to 30% of the diameter of the worm gears.

The first gear may be connected to the steering column at the opposite end of the steering column from the steering wheel.

The output gears may form part of the output shaft of the first and second motors respectively.

In accordance with a second aspect of the present disclosure, a vehicle comprises a steering column assembly in accordance with the disclosure.

BRIEF DESCRIPTION OF DRAWINGS

By way of example only, a specific exemplary arrangement of the present disclosure will now be described with reference to the accompanying drawings, in which.

DETAILED DESCRIPTION

Figure 1:
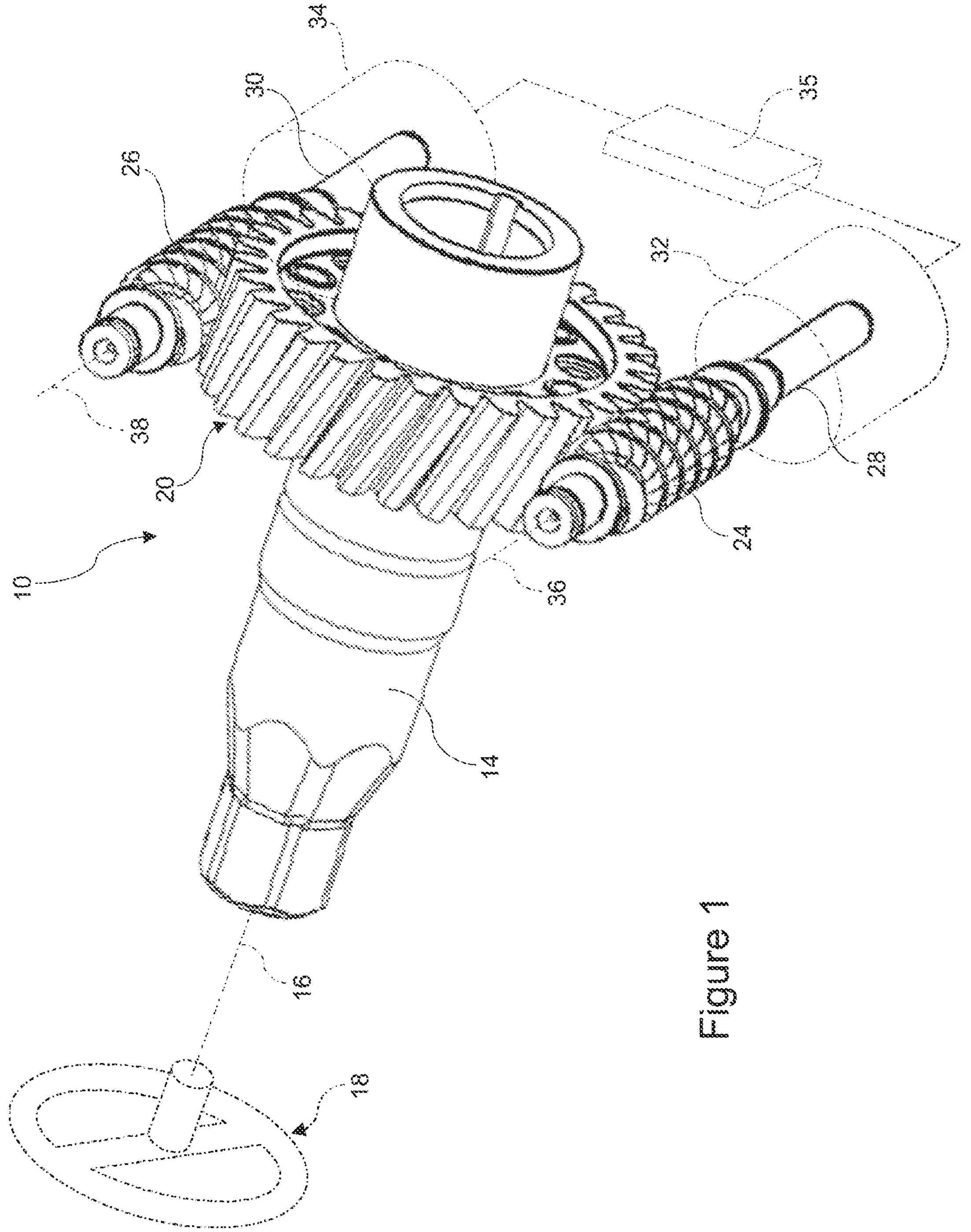
FIG. 1 is a perspective view from above and one side of an exemplary arrangement of a steering column assembly in accordance with the present disclosure.

A steer-by-wire steering column assembly 10 comprises a straight elongate steer-by-wire steering column 14 (only the lower end of which is illustrated) which is rotatably mounted about its longitudinal axis 16. A steering wheel 18 illustrated schematically in FIG. 1 is secured to the upper end of the steering column 14, by which the steering column 14 can be rotated by a driver. In the drawings, the steering column 14 is shown as a single shaft, but in practice it is likely to be formed from a number of components. For example, the steering column may be formed from several telescopic parts and may have a torque sensor (e.g. a torsion bar assembly) between the steering wheel end and the opposite end. A worm wheel gear in the form of a helical spur gear 20 is fixedly mounted on the lower end of the steering column 14 and is constrained to rotate with the steering column 14 and steering wheel 18 about the longitudinal axis 16.

The helical spur gear 20 is engaged with two identical worm screws 24, 26. Each worm screw 24, 26 is formed at one end of an output shaft 28, 30 of an electric motor 32, 34 (illustrated schematically in the drawings). Operation of the electric motors 32, 34 is controlled by a conventional electronic control unit (ECU) 35, also illustrated schematically in the drawings. The rotational axes 36, 38 of the motor output shaft 28, 30 are arranged parallel to one another and perpendicular to the rotational axis 16 of the steering column and are meshed with the helical spur gear 20 on opposite sides of the gear, at diametrically opposed positions.

Figures 2, 3:
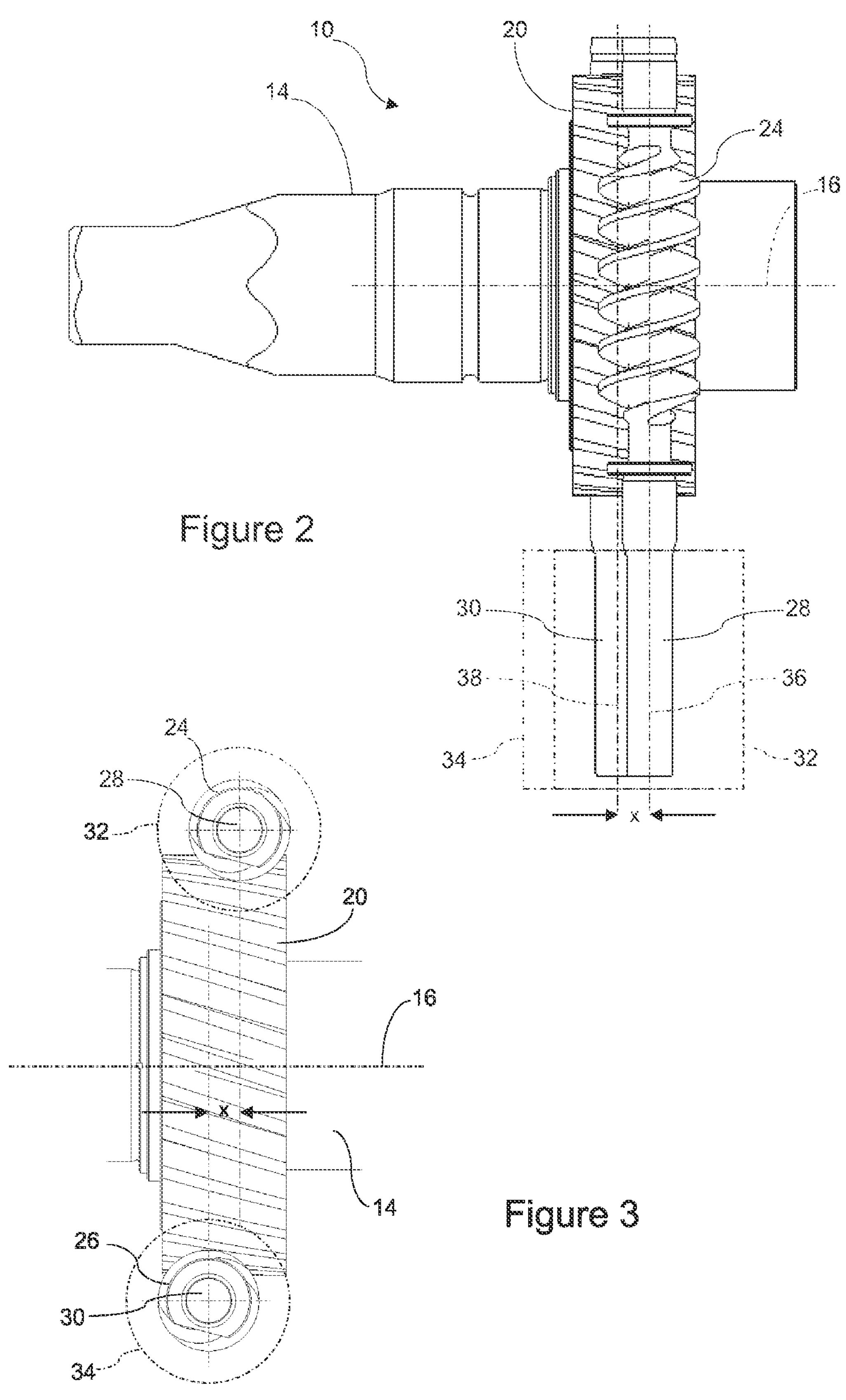
FIG. 2 is a side view of the steering column assembly of FIG. 1.
FIG. 3 is a top view of the steering column assembly of FIG. 1.
Figure 4:
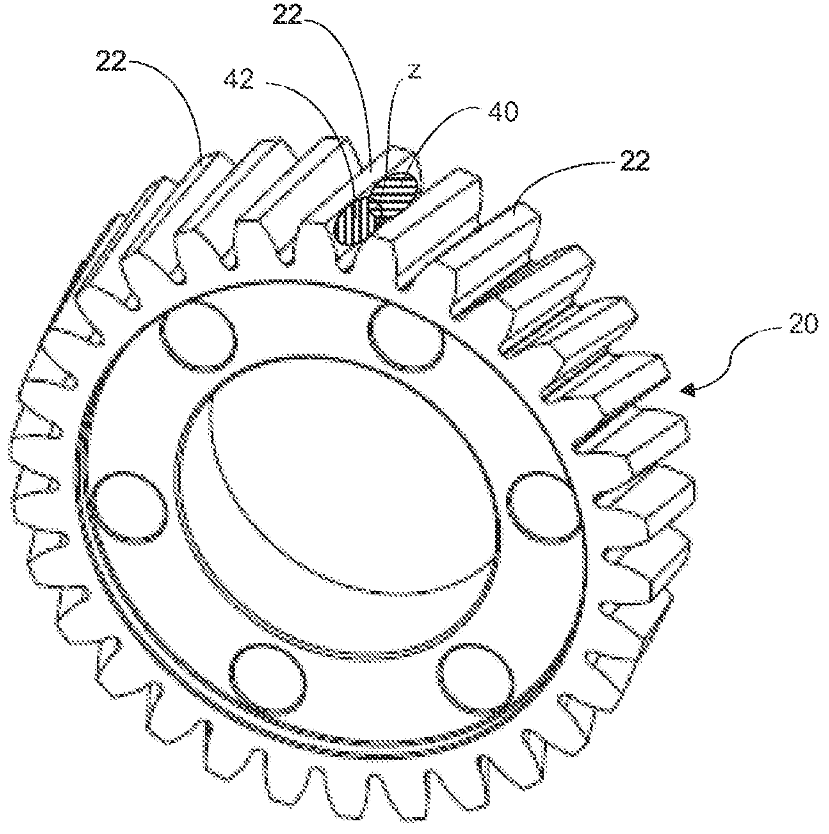
FIG. 4 is a perspective view of a worm wheel gear which forms part of the steering column assembly of FIG. 1, indicating the contact areas of two worm gears which form part of the assembly.

As best seen in FIGS. 2 and 3, the rotational axes 36, 38 of the worm screws 24, 26 are offset with respect to one another in the direction of the longitudinal axis 16 of the steering column 14 by a distance x. Consequently, as best seen in FIG. 4, the contact areas 40, 42 of the worm screws 24, 26 with the face and/or flank of the teeth 22 of the helical spur gear 20 are also offset with respect to one another in the direction of the longitudinal axis 16 of the steering column 14. Therefore, the two worm screws 24, 26 do not operate over the same contact areas 40, 42, which results in reduced wear and fatigue of the spur gear 20.

In FIG. 4, the contact areas 40, 42 are only shown on one tooth 22 of the spur gear 20, but the contact areas will be the same on all of the gear teeth.

In this exemplary arrangement, the total offset "x" of the rotational axes 36, 38 of the worm screws 24, 26 is 4 mm (i.e. each of the worm screws is displaced by 2 mm, but in opposite directions). The offset "x" should not be so large that (a) it increases the overall width of the worm wheel (spur gear 20) excessively or b) induces any undesirable forces across the worm wheel (spur gear 20) resulting from the moment arm generated by the offset and (c) should be should be sufficiently small so as to allow the action of the rotation of the worm gear (spur gear 20) to move gear lubricant across the flanks of the teeth of the worm wheel so as to ensure that the worm screw/worm gear (spur gear 20) contact is always well lubricated. For example, the total offset "x" of the rotational axes 36, 38 of the worm screws 24, 26 can be from 10% to 40%, and in one exemplary arrangement, 20% to 30%, of the worm screw diameter.

In this exemplary arrangement, the total offset "x" of the rotational axes 36, 38 of the worm screws 24, 26 and of the contact areas is 4 mm. However, the offset of the contact areas of the worm gears with respect to one another in the direction of the longitudinal axis should be less than or equal to the diameter of the worm screws, to limit the side loading on the worm gear (spur gear 20). For example, the offset of the contact areas can be from 10% to 40%, and more preferably from 20% to 30%, of the worm screw diameter.

As shown in FIG. 4, the contact areas 40, 42 of the two worm screws 24, 26 with the teeth of the helical spur gear 20 overlap partially, and for example the longitudinally inner portions of the contact areas 40, 42 (in the sense of the longitudinal axis 16) may overlap as shown at "z". This helps to ensure that rotation of the worm gear (spur gear 20) moves gear lubricants across the flanks of each tooth of the spur gear 20 so as to ensure that the worm screw/worm gear (spur gear 20) contact is always well lubricated.

In use, the steering assembly 10 is installed in a vehicle, typically the steering column 14 is inclined with respect to the horizontal by around 20° to 25° and the two worm screws 24, 26 are located on opposite lateral sides of the worm gear (spur gear 20).

Rotation of the steering wheel 18 by a driver results in rotation of the steering column 14 which is measured in a known manner and used to control the orientation of the steered wheels of the vehicle by an electronic control unit in a steer-by-wire manner, i.e. without any direct mechanical connection between the steering wheel and the steered wheels. Rotation of the worm screws 24, 26 by their respective motors 32, 34 is controlled by the ECU 35 to apply feedback torque to the steering column 14 and the steering wheel 18, in order to provide a sensation of road feel to the driver. By using two worm screws 24, 26, the torque applied to each of them can be controlled in order to reduce backlash and gear rattle.

In addition, by offsetting the contact areas of the worm screws 24, 26 with the teeth of the worm gear (spur gear 20), the wear of the worm gear is reduced and the useful life of the worm gear is extended.

The disclosure is not restricted to the details of the foregoing exemplary arrangement.

The invention claimed is:

1. A steering column assembly for a vehicle, comprising:
- a steering column rotatably mounted about a longitudinal axis and configured for attachment of a steering wheel at one end;
- a first gear configured to rotate with the steering column;
- first and second motors, each of the first and second motors each having an output driving a respective output gear, the output gears being engaged with the first gear; and
- a control arrangement configured to operate the motors to apply torque to the first gear,
- wherein the first and second output gears are offset with respect to one another in a direction of the longitudinal axis such that each output gear simultaneously engages a single set of teeth of the first gear at axially displaced regions, configured to produce a partial overlap of contact areas on individual teeth of the single set of teeth of the first gear.

2. A steering column assembly as claimed in claim 1, wherein rotational axes of the output gears extend perpendicularly to a rotational axis of the first gear.

3. A steering column assembly as claimed in claim 2, wherein the rotational axes of the output gears are parallel.

4. A steering column assembly as claimed in claim 3, wherein the output gears are substantially identical.

5. A steering column assembly as claimed in claim 1, wherein rotational axes of the output gears are parallel.

6. A steering column assembly as claimed in claim 1, wherein the output gears are substantially identical.

7. A steering column assembly as claimed in claim 1, wherein the output gears comprise worm gears.

8. A steering column assembly as claimed in claim 7, wherein the worm gears are substantially identical and the offset of the contact areas of the worm gears with respect to one another in the direction of the longitudinal axis is less than or equal to a diameter of the worm gears.

9. A steering column assembly as claimed in claim 8, wherein the offset of the contact areas of the worm gears with respect to one another in the direction of the longitudinal axis is from 10% to 40% of the diameter of the worm gears.

10. A steering column assembly as claimed in claim 9, wherein the offset of the contact areas of the worm gears with respect to one another in the direction of the longitudinal axis is from 20% to 30% of the diameter of the worm gears.

11. A steering column assembly as claimed in claim 10, wherein the offset of the worm gears with respect to one another in the direction of the longitudinal axis is less than or equal to the diameter of the worm gears.

12. A steering column assembly as claimed in claim 11, wherein the offset of the worm gears with respect to one another in the direction of the longitudinal axis is from 10% to 40% of the diameter of the worm gears.

13. A steering column assembly as claimed in claim 9, wherein rotational axes of the worm gears are offset with respect to one another in the direction of the longitudinal axis.

14. A steering column assembly as claimed in claim 8, wherein rotational axes of the worm gears are offset with respect to one another in the direction of the longitudinal axis.

15. A steering column assembly as claimed in claim 8, wherein the offset of the worm gears with respect to one another in the direction of the longitudinal axis is less than or equal to the diameter of the worm gears.

16. A steering column assembly as claimed in claim 15, wherein the offset of the worm gears with respect to one another in the direction of the longitudinal axis is from 10% to 40% of the diameter of the worm gears.

17. A steering column assembly as claimed in claim 16, wherein the offset of the worm gears with respect to one another in the direction of the longitudinal axis is from 20% to 30% of the diameter of the worm gears.

18. A steering column assembly as claimed in claim 1, wherein the first gear is connected to the steering column at an opposite end of the steering column from the steering wheel.

19. A steering column assembly as claimed in claim 1, wherein the output gears form part of an output shaft of the first and second motors respectively.

20. A vehicle comprising a steering column assembly as claimed in claim 1.

21. The steering column assembly of claim 1, wherein the first gear comprises the single set of teeth, and the partial overlap occurs on opposing flank regions of each said tooth.

* * * * *